United States Patent
Wickert et al.

(10) Patent No.: US 9,806,384 B2
(45) Date of Patent: Oct. 31, 2017

(54) REGULATING DEVICE FOR REGULATING A COOLING CIRCUIT FOR TEMPERATURE CONTROL OF A BATTERY SYSTEM HAVING MORE THAN ONE HEATING AND/OR COOLING ELEMENT

(71) Applicants: Robert Bosch GmbH, Stuttgart (DE); Samsung SDI Co., Ltd., Yongin-si, Gyeonggi-do (KR)

(72) Inventors: Stefan Wickert, Albershausen (DE); Christian Loew, Stuttgart (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 601 days.

(21) Appl. No.: 14/374,688

(22) PCT Filed: Jan. 29, 2013

(86) PCT No.: PCT/EP2013/051662
§ 371 (c)(1),
(2) Date: Jul. 25, 2014

(87) PCT Pub. No.: WO2013/113692
PCT Pub. Date: Aug. 8, 2013

(65) Prior Publication Data
US 2015/0007972 A1 Jan. 8, 2015

(30) Foreign Application Priority Data

Feb. 3, 2012 (DE) .................. 10 2012 201 609

(51) Int. Cl.
*G05D 23/00* (2006.01)
*H01M 10/613* (2014.01)
(Continued)

(52) U.S. Cl.
CPC ......... *H01M 10/5004* (2013.01); *F28F 27/00* (2013.01); *G05D 23/1917* (2013.01); *H01M 10/613* (2015.04)

(58) Field of Classification Search
None
See application file for complete search history.

(56) References Cited

U.S. PATENT DOCUMENTS 6,464,027 B1 * 10/2002 Dage ..................... B60H 1/004
123/41.14
2004/0216450 A1 11/2004 Okazaki et al.
(Continued)

FOREIGN PATENT DOCUMENTS

DE 101 56 250 A1 5/2003
DE 101 63 944 A1 7/2003
(Continued)

OTHER PUBLICATIONS

International Search Report corresponding to PCT Application No. PCT/EP2013/051662, dated Apr. 26, 2013 (German and English language document) (6 pages).

*Primary Examiner* — Diem Cao
(74) *Attorney, Agent, or Firm* — Maginot, Moore & Beck LLP

(57) ABSTRACT

A regulating device for regulating a cooling circuit is described. The regulating device according to the disclosure includes a first regulating stage, wherein the first regulating stage is designed to determine, using one or more input variables, a cooling/heating power of the cooling circuit or a variable proportional thereto. The first regulating stage is also designed to determine a first control deviation. The first regulating stage is also designed to output a controlled variable of the first regulating stage comprising a desired temperature of a coolant or a variable proportional thereto, which is derived from the first control deviation. The regu- (Continued)

lating device according to the disclosure also includes a second regulating stage, wherein the second regulating stage is positioned in series with the first regulating stage and designed to receive the controlled variable of the first regulating stage as a control output. The second regulating stage is also designed to determine a second control deviation. The second regulating stage is also designed to output a controlled variable of the second regulating stage comprising an abstract signal, which is derived from the second control deviation.

13 Claims, 1 Drawing Sheet

(51) Int. Cl.
*G05D 23/19* (2006.01)
*F28F 27/00* (2006.01)

(56) References Cited

U.S. PATENT DOCUMENTS

| 2006/0060236 | A1  | 3/2006  | Kim |
| 2009/0321532 | A1  | 12/2009 | Maitre |
| 2010/0304193 | A1  | 12/2010 | Karlsson et al. |
| 2012/0082871 | A1* | 4/2012  | Simonini ................. B60L 1/04 429/50 |

FOREIGN PATENT DOCUMENTS

| DE | 102 28 355 A1     | 1/2004 |
| DE | 10 2007 023 057 B3 | 1/2009 |

* cited by examiner

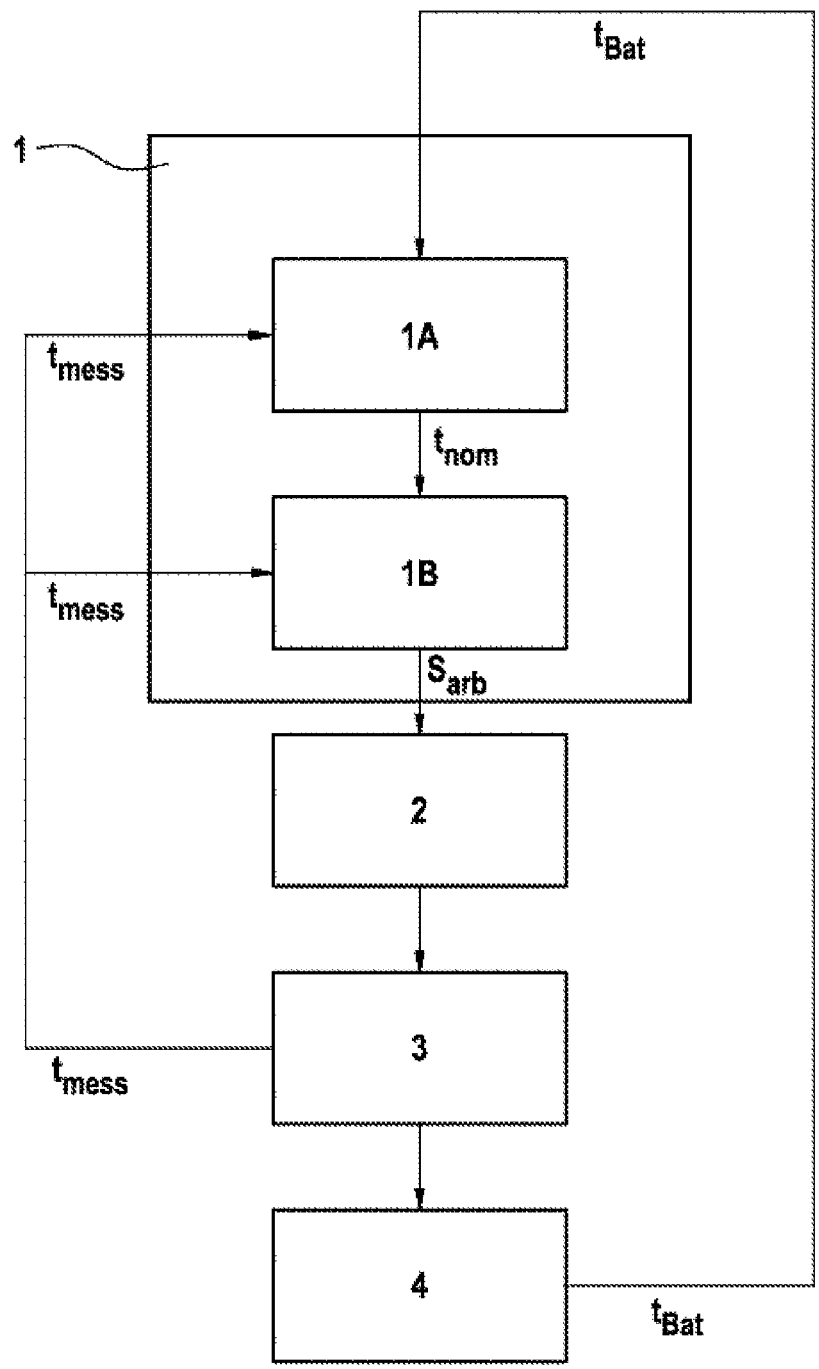

REGULATING DEVICE FOR REGULATING A COOLING CIRCUIT FOR TEMPERATURE CONTROL OF A BATTERY SYSTEM HAVING MORE THAN ONE HEATING AND/OR COOLING ELEMENT

This application is a 35 U.S.C. §371 National Stage Application of PCT/EP2013/051662, filed on Jan. 29, 2013, which claims the benefit of priority to Serial No. DE 10 2012 201 609.0, filed on Feb. 3, 2012 in Germany, the disclosures of which are incorporated herein by reference in their entirety.

The present disclosure relates to a regulating device for regulating a cooling circuit for temperature control of a battery system with more than one heating and/or cooling element as well as a cooling circuit and a motor vehicle containing such a regulating device.

BACKGROUND

Battery systems in motor vehicles are generally operated in a certain temperature range in order to achieve highly optimal performance and service life. A wide variety of temperature control systems are known that can be used to guarantee said objective. Mostly, a cooling circuit with a liquid or gaseous coolant is used in order to heat or cool the battery system as required and thus to keep within the desired temperature range. Such cooling circuits for the temperature control of a battery system generally comprise a plurality of heating and/or cooling components, such as e.g. an air conditioning system and a low temperature cooling device with a fan. A variety of configurations is now conceivable, in which said heating and/or cooling elements are disposed in the cooling circuit and can be operated continuously or discretely, mixed, additionally or alternatively to each other in order to bring the coolant in the cooling circuit to a desired temperature in order to keep the battery system within the desired temperature range.

With all said configurations it is common that this is achieved by different, continuously and/or discretely operated controllers for the individual heating and/or cooling elements, which can be connected in suitable combinations with each other. Said suitable combinations can cause the battery system to be heated or cooled accordingly depending on different boundary conditions.

In certain systems, the controllers for the individual heating and/or cooling elements of the cooling circuit are switched depending on the boundary conditions and the temperature in the battery system. If the desired battery temperature is not achieved, then a fault is signaled. In this it is necessary to adapt the logic that switches the controllers depending on the configuration of the cooling circuit in a complex manner; the logic is complex and unclear for the application.

SUMMARY

According to the disclosure, a regulating device is provided for regulating a cooling circuit with more than one heating and/or cooling element for the temperature control of a battery system, wherein the regulating device comprises two regulating stages disposed in series. Preferably, the two regulating stages are disposed immediately one after the other. The regulating device according to the disclosure is wherein the first regulating stage is implemented such that a certain cooling/heating power $P_{nom}$ of the cooling circuit or a variable proportional thereto can be determined depending on one or more input variables, a control deviation thereof can be determined and a desired temperature $t_{nom}$ of the coolant or a variable proportional thereto can be output as a controlled variable of the first regulating stage derived from the control deviation; and the second regulating stage is implemented such that the controlled variable of the first regulating stage is fed to the second regulating stage as a control input, a control deviation thereof can be determined and depending on the control deviation an abstract signal $S_{arb}$ can be output as a controlled variable of the second regulating stage.

The abstract signal $S_{arb}$ can then be converted into control commands for the controllers of the plurality of heating and/or cooling elements of the cooling circuit.

With the regulating device according to the disclosure, an abstract regulator structure is provided whose regulator output can be simply converted without complex adjustments into different controller signals for a variety of configurations of cooling circuits for the temperature control of battery systems. For this purpose, the regulating device according to the disclosure is cascaded in two regulating stages. In the first regulating stage a required cooling/heating power or a variable proportional thereto is initially determined depending on certain input variables. From said variable a desired temperature of the coolant in the cooling circuit or a variable proportional thereto is output as a regulator output or a controlled variable of the first regulating stage, possibly taking into account characteristics of the cooling circuit used, such as e.g. mass flow and heat transfer between the battery system and the coolant. Said controlled variable of the first regulating stage is fed to the second regulating stage as a control input. The second regulating stage regulates the coolant temperature. Depending on the difference between the temperature of the coolant specified by the first regulating stage, in the second regulating stage the controlled variable is output as an abstract signal, e.g. a numerical value. Said abstract signal can be converted by simply applicable logic into control signals for the controllers of the plurality of heating and/or cooling elements of the respective cooling circuit. This enables the regulating device according to the disclosure to be used without problems for a number of diverse configurations of cooling circuits without having to carry out a complex adaptation to the specific embodiment every time. It is entirely sufficient if the logic for conversion of the output signal of the regulating device into control commands of the controllers is adapted to the respective specific embodiment of the cooling circuit. The regulating device according to the disclosure is moreover tolerant to the failure of individual heating and/or cooling elements. Because of the regulating circuit used, the failure of an element is automatically compensated by suitable regulation of the remaining elements.

The regulating device according to the disclosure is suitable for the regulation of a cooling circuit with more than one heating and/or cooling element for the temperature control of a battery system. A coolant circulates in the cooling circuit, being used for the transfer of thermal energy to or for receiving thermal energy from the battery system. In order to be able to keep the battery system within a specified temperature range, the cooling circuit comprises a plurality of heating and/or cooling elements. Suitable cooling circuits and heating and/or cooling elements are known to the person skilled in the art. For example, a fan, a low temperature cooling device, an air conditioning system and a heat exchanger are known as heating and/or cooling elements.

Depending on one or more input variables, the regulating device according to the disclosure enables the output of an abstract signal $S_{arb}$, which can then be converted by suitable logic into control commands for the controllers of the plurality of heating and/or cooling elements of the cooling circuit. A variety of input variables can come into use for this. Preferably, input variables are used that allow a conclusion to be drawn regarding a current temperature of the battery system or that cause a change in the temperature of the battery system to be expected.

For example, the current power with which the battery is being charged or discharged, the current thermal performance of the battery, the current maximum cooling/heating power of the cooling circuit, the current ambient temperature, the current state of charge of the battery, the current battery temperature, a current cooling/heating power of the cooling circuit, a temperature difference between the measured and desired battery temperature, a maximum temperature of the battery or individual battery cells, a variable that is proportional to one of the above-mentioned variables and/or a combination of a plurality of or all of the above-mentioned variables can be used as input variable(s) for the first regulating stage of the regulating device.

The first regulating stage of the regulating device according to the disclosure can be implemented as a PI regulator, i.e. as a regulator with proportional-integral behavior. PI regulators are known to the person skilled in the art and can be provided inexpensively as compatible and easily applied components.

Preferably, the PI regulator is implemented as a characteristic field based PI regulator. In that case the P component of the PI regulator of the first regulating stage of the regulating device according to the disclosure can comprise one or more characteristic fields, from which a predetermined cooling/heating power $P_{nom}$ of the cooling circuit or a variable proportional thereto can be determined for the respective input variable(s) used.

The implementation as a characteristic field based P component of a PI regulator has the advantage of simple implementation and dependence on only a few general battery and vehicle parameters.

The I component of the PI regulator of the first regulating stage can be implemented such that a desired temperature $t_{nom}$ of the coolant or a variable proportional thereto is determined as a controlled variable of the first regulating stage from the difference between the determined cooling/heating power $P_{nom}$ of the cooling circuit or the variable proportional thereto and a measured cooling/heating power $P_{mess}$ of the cooling circuit or a variable suitably proportional thereto. Alternatively or additionally, said I component can also integrate the deviation of the battery temperature from the target battery temperature and the regulator output can in turn be a target cooling power by suitable normalization. The conversion of a cooling/heating power into a coolant mass flow and a coolant temperature can be obtained in certain systems. During this a constant, variable or current measured mass flow of the coolant can be taken into account as required and depending on the implementation of the cooling circuit. In a preferred implementation, the desired temperature $t_{nom}$ of the coolant or the variable proportional thereto is determined as a controlled variable of the first regulating stage taking into account a constant, variable or measured mass flow it of the coolant in the cooling circuit.

In order to avoid driving the controllers of the plurality of heating and/or cooling elements that are already triggered by the smallest differences between the determined cooling/ heating power $P_{nom}$ of the cooling circuit or the variable proportional thereto and a measured cooling/heating power $P_{mess}$ of the cooling circuit or a variable proportional thereto, a so-called "dead zone" can be provided around a region about the different magnitude of 0. The advantage of such a "dead zone" can be that the cooling circuit is subjected to smaller loads and does not have to carry out control processes every time. In order to ensure such a "dead zone", e.g. the I component of the PI regulator of the first regulating stage can be implemented such that the magnitude of the difference between the determined cooling/heating power $P_{nom}$ of the cooling circuit or the variable proportional thereto and a measured cooling/heating power $P_{mess}$ of the cooling circuit or a variable proportional thereto is compared with a threshold value and a change of the controlled variable of the first regulating stage can only be output on exceeding said threshold value. The extent of the "dead zone" is determined by specifying the threshold value.

In order to avoid an overflow in the I component of the PI regulator during operation of the regulating device according to the disclosure, a so-called "windup" effect, the I component of the PI regulator can be provided with anti-"windup" measures.

In particular, the I component of the PI regulator of the first regulating stage is implemented such that the integration in the I component is limited to ensure that the capability of the cooling circuit is not exceeded (anti-windup).

The regulating device according to the disclosure is wherein a second regulating stage is connected downstream of the first regulating stage and that the control output or the controlled variable of the first regulating stage is fed to the second regulating stage as an input variable or control input. For this purpose the second regulating stage is implemented such that the controlled variable of the first regulating stage can be fed to the second regulating stage as a control input, a control deviation thereof can be determined and an abstract signal $S_{arb}$ can be output as a controlled variable of the second regulating stage depending on the control deviation. During this the controlled variable of the first regulating stage and the control input of the second regulating stage is formed as a desired temperature $t_{nom}$ of the coolant or a variable proportional thereto, wherein the desired temperature $t_{nom}$ of the coolant is preferably used. The second regulating stage is preferably embodied such that a difference of the desired temperature $t_{nom}$ of the coolant or the variable proportional thereto and a corresponding measurement variable, i.e. a measured temperature $T_{mess}$ of the coolant or a corresponding variable proportional thereto, is determined as a control deviation. Depending on the control deviation, an abstract signal $S_{arb}$ is determined and is output as a controlled variable of the second regulating stage and thus as a control output of the regulating device according to the disclosure. The second regulating stage can be implemented for this purpose as an I regulator, i.e. as a regulator with integral behavior. I regulators are known to the person skilled in the art and can be inexpensively provided as compatible and easily applicable components. The abstract signal $S_{arb}$ can e.g. be in the form of a numerical value.

The abstract signal $S_{arb}$ can then be fed to a logic unit, which is used for the conversion of the abstract signal $S_{arb}$ into specific control commands for the controllers of the plurality of heating/cooling elements of the cooling circuit. Specific characteristic curves for the specific cooling circuit to be regulated can be placed in said logic unit, from which defined control of the controllers of the heating/cooling elements of the cooling circuit results for each abstract signal $S_{arb}$ of the regulating device according to the disclosure. The logic can also comprise a plurality of different characteristic curves here, wherein the selection of the respective characteristic curve for the conversion of the abstract signal $S_{arb}$ can depend on other factors. Said other factors can be e.g. certain speed states of the automobile or certain ambient temperatures. This enables a defined abstract signal $S_{arb}$ to cause different operating states of the heating/cooling elements of the cooling circuit depending on other factors.

The regulating device according to the disclosure is especially wherein it can be manufactured simply and inexpensively and can be used for a number of diverse cooling circuits, irrespective of how many heating/cooling elements are present in the cooling circuit and of the type of said heating/cooling elements. The adaptation of the regulating device according to the disclosure to the specific embodiment of the cooling circuit to be regulated can e.g. be achieved by means of the configuration and storage of corresponding characteristic curves for the conversion of the abstract output signal of the regulating device into control commands for the controllers of the heating/cooling elements of the cooling circuit.

The present disclosure also additionally includes a cooling circuit for the temperature control of a battery system comprising a plurality of heating and/or cooling elements, wherein the cooling circuit comprises one or a plurality of regulating devices according to the disclosure.

The subject matter of the disclosure is also a motor vehicle comprising one of a plurality of regulating devices according to the disclosure or one or a plurality of cooling circuits according to the disclosure.

The present disclosure relates to the use of a combination of a PI regulator and an I regulator for the regulation of a cooling circuit with a plurality of heating and/or cooling elements for the temperature control of a battery system, wherein the control output of the PI regulator is used as a control input by the downstream I regulator.

The subject matter of the disclosure is also a method for regulating a cooling circuit with a plurality of heating and/or cooling elements for the temperature control of a battery system, wherein the method according to the disclosure comprises steps that are described as features of the regulating device according to the disclosure.

The battery system mentioned in the disclosure is preferably a battery system with lithium-ion accumulators.

BRIEF DESCRIPTION OF THE DRAWINGS

Exemplary embodiments of the disclosure are described in detail using the FIGURE and the following description. In the FIGURES:

The FIGURE shows schematically the regulating circuit of a regulating device according to the disclosure in combination with a cooling circuit and a battery system to be temperature controlled.

DETAILED DESCRIPTION

In the FIGURE the regulating circuit of a regulating device 1 according to the disclosure is shown schematically in combination with a cooling circuit 3 and a battery system 4 to be temperature controlled.

The regulating device 1 according to the disclosure is used to regulate the cooling circuit 3 with more than one heating and/or cooling element for the temperature control of a battery system 4. The regulating device 1 comprises for this a first regulating stage 1A and a second regulating stage 1B connected downstream of the first regulating stage 1A.

The regulating stage 1A is configured as a PI regulator and the second regulating stage 1B as an I regulator.

A current battery temperature $t_{Bat}$ of the battery system 4 is fed to the first regulating stage 1A of the regulating device 1 as an input variable. The PI regulator of the first regulating stage 1A comprises a characteristic field based P component, which determines a defined nominal cooling/heating power $P_{nom}$ of the cooling circuit 3 from the input variable $t_{Bat}$. Instead of the nominal cooling/heating power $P_{nom}$ of the cooling circuit 3, a variable proportional thereto can also be determined from the characteristic field. The I component of the PI regulator of the first regulating stage 1A determines a control deviation from said nominal cooling/heating power $P_{nom}$ of the cooling circuit 3 and taking into account a measured current cooling/heating power $P_{mess}$ of the cooling system 3, e.g. by forming a difference of the two variables. Alternatively or additionally, the I component can also use the control difference of the battery temperature. Depending on the value of said control deviation, the PI regulator of the first regulating stage 1A outputs a controlled variable that is in the form of the defined nominal cooling power $P_{nom}$ or the temperature $t_{nom}$ of the coolant of the cooling circuit 3 or of a variable proportional thereto. During the determination of the controlled variable of the first regulating stage 1A, the defined nominal temperature $t_{nom}$ of the coolant of the cooling circuit 3 is calculated from $P_{nom}$ while taking into account a constant, variable or measured mass flow ṁ of the coolant in the cooling circuit 3.

The controlled variable of the first regulating stage 1A is fed to the second regulating stage 1B as a control input or input value. The second regulating stage 1B is in the form of an I regulator. In the second regulating stage 1B, a control deviation is determined from a difference of the defined nominal temperature $t_{nom}$ of the coolant or the variable proportional thereto and a corresponding measurement variable, the current measured temperature $t_{mess}$ of the coolant or a corresponding variable proportional thereto. Depending on the control deviation of the second regulating stage 1B, an abstract signal $S_{arb}$ is then determined and output as a controlled variable of the second regulating stage 1B and thus as a regulating output of the regulating device 1 according to the disclosure.

Said abstract signal $S_{arb}$ is then fed to a logic unit 2, which is used to convert the abstract signal $S_{arb}$ into specific control commands for the controllers of the plurality of heating/cooling elements of the cooling circuit 3. Specific characteristic curves for the specific cooling circuit 3 are stored in said logic unit 2, from which a defined control input for the controllers of the heating/cooling elements of the cooling circuit 3 results for each abstract signal $S_{arb}$ of the regulating device 1 according to the disclosure. The logic unit 2 can also comprise a plurality of different characteristic curves in this case, wherein the selection of the respective characteristic curve for the conversion of the abstract signal $S_{arb}$ can depend on other factors. Said other factors can be e.g. defined speed states of the automobile or defined ambient temperatures. This enables a defined abstract signal $S_{arb}$ to cause different operating states of the heating/cooling elements of the cooling circuit 3 depending on other factors.

The logic unit 2 outputs control commands to the controllers of the plurality of heating/cooling elements of the cooling circuit 3 depending on the abstract signal $S_{arb}$ of the regulating device 1 and thus influences the temperature of the coolant in the cooling circuit 3, so that the current temperature $t_{mess}$ of the coolant approximates to the nominal temperature $t_{nom}$ of the coolant. The cooling circuit 3 can affect the temperature $t_{Bat}$ of the battery system 4 by means of the change of the current temperature $t_{mess}$ of the coolant.

The current temperature $t_{mess}$ of the coolant of the cooling circuit 3 is reported back to the of regulating device 1. Thereby $t_{mess}$ is used in the second regulating stage 1B in order to determine the control deviation for the determination of the abstract signal $S_{arb}$. Following a conversion of $t_{mess}$ into the current cooling/heating power $P_{mess}$ of the cooling circuit 3, optionally $P_{mess}$ is used to determine the control deviation in the first regulating stage 1A in order to determine $t_{nom}$ therefrom. In the regulating device 1 according to the disclosure, the conversion of $t_{mess}$ into $P_{mess}$ can be a component of the first regulating stage 1A of the regulating device according to the disclosure or even a separate logic unit.

The invention claimed is:

1. A regulating device for regulating a cooling circuit for a battery including at least one of a plurality of heating elements and cooling elements, the regulating device comprising:
   a first regulating stage configured to:
      (i) determine, using one or more input variables, a cooling/heating power of the cooling circuit, or a variable proportional thereto;
      (ii) determine a first control deviation using the cooling/heating power or the variable proportional thereto; and
      (iii) output a controlled variable of the first regulating stage comprising a desired temperature of a coolant, or a variable proportional thereto, derived from the first control deviation; and
   a second regulating stage positioned in series with the first regulating stage and configured to:
      (i) receive the controlled variable of the first regulating stage as a control input;
      (ii) determine a second control deviation using the controlled variable of the first regulating stage; and
      (iii) output a controlled variable of the second regulating stage comprising an abstract signal derived from the second control deviation, the controlled variable of the second regulating stage provided to the at least one of a plurality of heating elements and cooling elements to regulate the cooling circuit.

2. The regulating device as claimed in claim 1, wherein the second regulating stage is further configured to convert the abstract signal into control commands for the at least one of a plurality of heating elements and cooling elements of the cooling circuit.

3. The regulating device as claimed in claim 1, wherein the first regulating stage is configured as a PI regulator.

4. The regulating device as claimed in claim 3, wherein a P component of the PI regulator of the first regulating stage comprises one or more characteristic fields configured to determine the cooling/heating power of the cooling circuit, or the variable proportional thereto, based on the one or more input variables.

5. The regulating device as claimed in claim 3, wherein an I component of the PI regulator of the first regulating stage is configured to provide the controlled variable comprising the desired temperature of the coolant, or the variable proportional thereto, based on the difference between the determined cooling/heating power of the cooling circuit, or the variable proportional thereto, and a measured cooling/heating power of the cooling circuit, or a variable proportional thereto.

6. The regulating device as claimed in claim 5, wherein the desired temperature of the coolant, or the variable proportional thereto, is determined as a controlled variable of the first regulating stage taking into account a constant, variable or measured mass flow of the coolant in the cooling circuit.

7. The regulating device as claimed in claim 5, wherein the I component of the PI regulator of the first regulating stage is configured to:
   (i) determine a magnitude of a difference between the determined cooling/heating power of the cooling circuit, or the variable proportional thereto, and a measured cooling/heating power of the cooling circuit, or a variable proportional thereto,
   (ii) compare the magnitude of the difference with a threshold value and
   (iii) output the magnitude of the difference as the controlled variable of the first regulating stage if the magnitude of the difference exceeds the threshold value.

8. The regulating device as claimed in claim 5, wherein the I component of the PI regulator of the first regulating stage is configured to limit the integration in the I component to ensure that a capability of the cooling circuit is not exceeded.

9. The regulating device as claimed in claim 1, wherein the second regulating stage is configured as an I regulator.

10. The regulating device as claimed in claim 1, wherein the controlled variable of the first regulating stage and the control input comprise a desired temperature of the coolant.

11. The regulating device as claimed in claim 1, wherein the one or more input variables comprise at least one of a current power with which a battery is being charged or discharged, a current thermal performance of the battery, a current maximum the cooling/heating power of the cooling circuit, a current ambient temperature, a current state of charge of the battery, a current battery temperature, a temperature difference between measured and desired battery temperatures, a maximum temperature of the battery or individual battery cells, and a variable proportional to one of the above-mentioned variables.

12. A cooling circuit for a temperature control of a battery system including at least one of a plurality of heating elements and cooling elements, the cooling circuit comprising:
   a first regulating stage configured to:
      (i) determine, using one or more input variables, a cooling/heating power of the cooling circuit, or a variable proportional thereto;
      (ii) determine a first control deviation using the cooling/heating power or the variable proportional thereto; and
      (iii) output a controlled variable of the first regulating stage comprising a desired temperature of a coolant, or a variable proportional thereto, derived from the first control deviation; and
   a second regulating stage positioned in series with the first regulating stage and configured to:
      (i) receive the controlled variable of the first regulating stage as a control input;
      (ii) determine a second control deviation using the controlled variable of the first regulating stage; and
      (iii) output a controlled variable of the second regulating stage comprising an abstract signal derived from the second control deviation, the controlled variable of the second regulating stage provided to the at least one of a plurality of heating elements and cooling elements to regulate the cooling circuit.

13. A motor vehicle, comprising:

at least one regulating device for regulating a cooling circuit for a battery including at least one of a plurality of heating elements and cooling elements, each regulating device including:
- a first regulating stage configured to:
  - (i) determine, using one or more input variables, a cooling/heating power of the cooling circuit, or a variable proportional thereto;
  - (ii) determine a first control deviation using the cooling/heating power or the variable proportional thereto; and
  - (iii) output a controlled variable of the first regulating stage comprising a desired temperature of a coolant, or a variable proportional thereto, derived from the first control deviation; and
- a second regulating stage positioned in series with the first regulating stage and configured to:
  - (i) receive the controlled variable of the first regulating stage as a control input;
  - (ii) determine a second control deviation using the controlled variable of the first regulating stage; and
  - (iii) output a controlled variable of the second regulating stage comprising an abstract signal derived from the second control deviation, the controlled variable of the second regulating stage provided to the at least one of a plurality of heating elements and cooling elements to regulate the cooling circuit.

* * * * *